July 16, 1940.  M. H. HOLLINGSWORTH  2,207,736
AUTOMOBILE STEERING MEANS
Filed Sept. 3, 1936   3 Sheets-Sheet 1
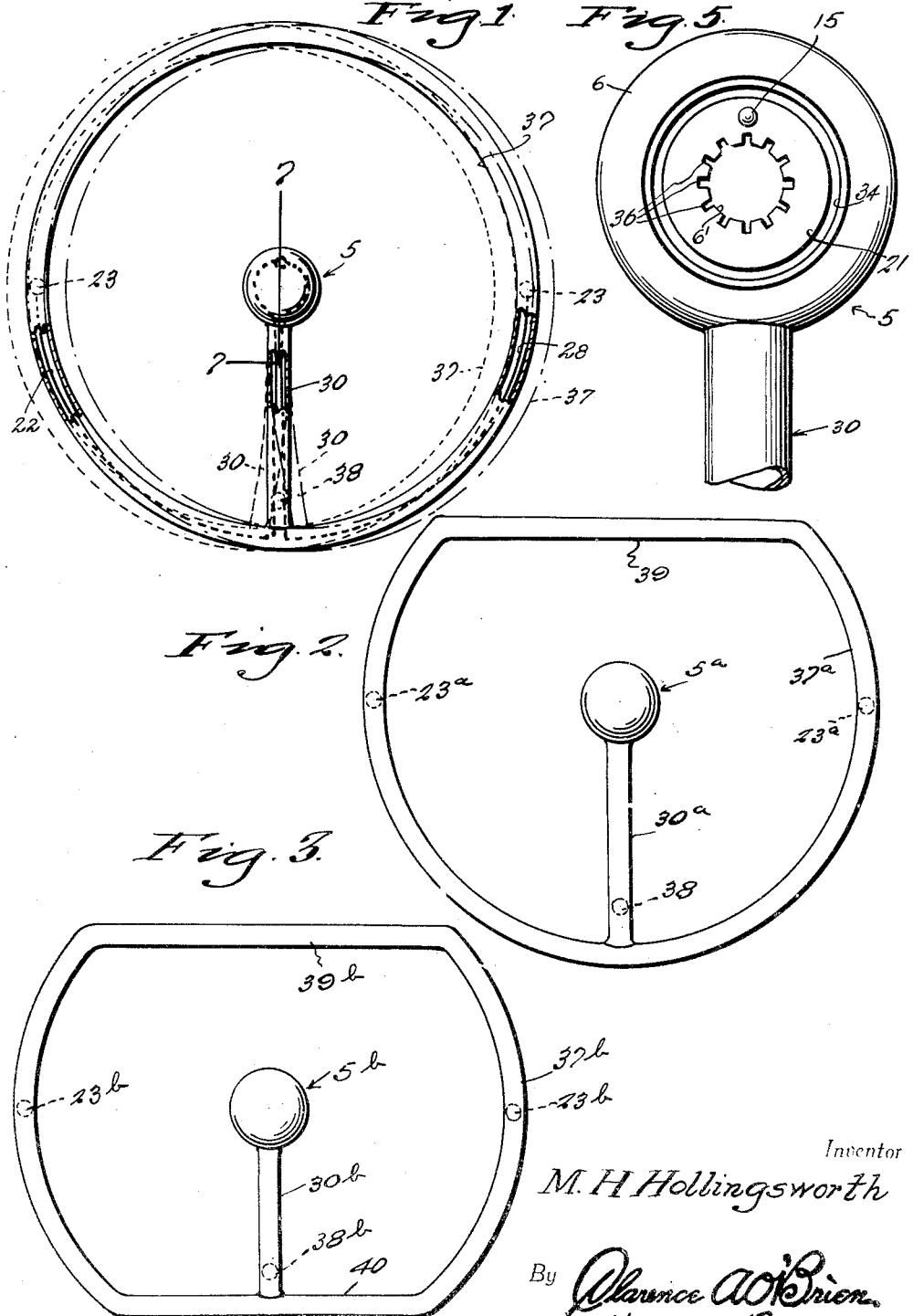
Inventor
M. H. Hollingsworth
By Clarence A. O'Brien
Hyman Berman
Attorneys July 16, 1940.  M. H. HOLLINGSWORTH  2,207,736
AUTOMOBILE STEERING MEANS
Filed Sept. 3, 1936   3 Sheets-Sheet 2
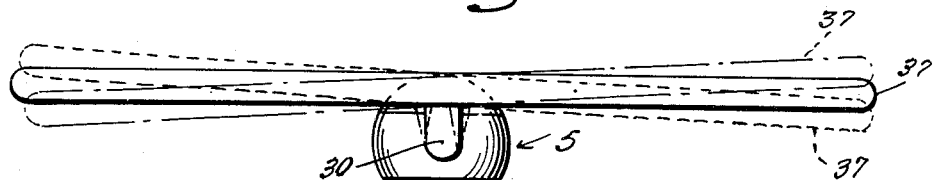
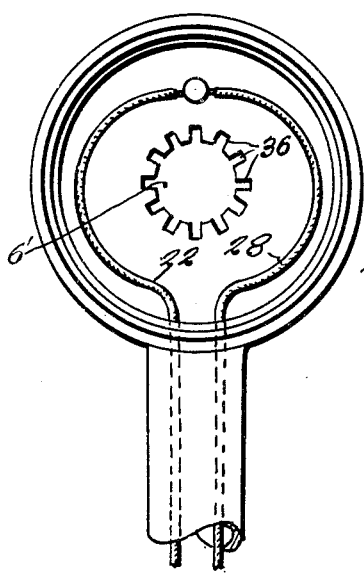
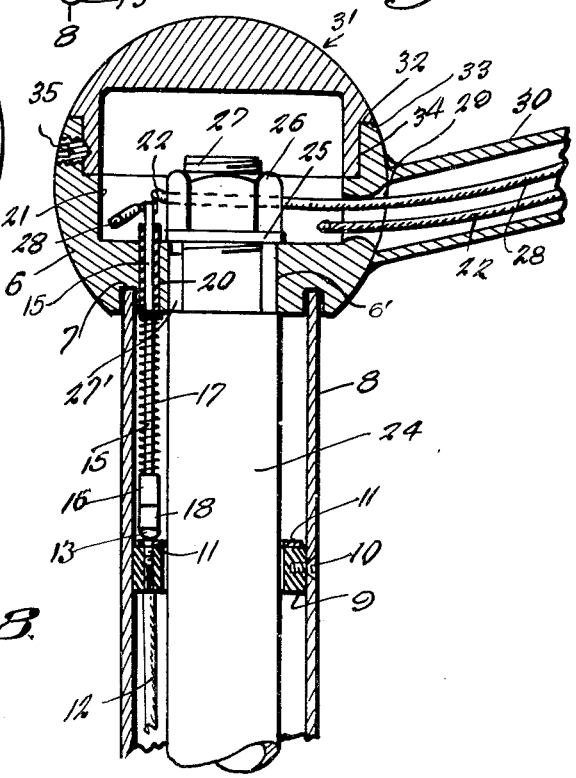
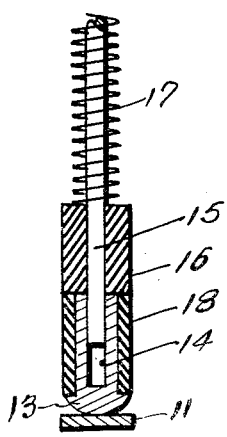
Inventor
M. H. Hollingsworth
By Clarence A. O'Brien
Hyman Berman
Attorneys July 16, 1940.                M. H. HOLLINGSWORTH                2,207,736
                              AUTOMOBILE STEERING MEANS
                        Filed Sept. 3, 1936          3 Sheets-Sheet 3
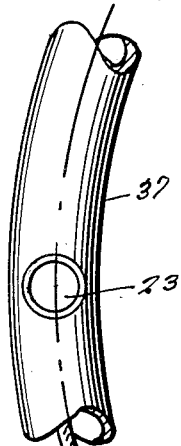
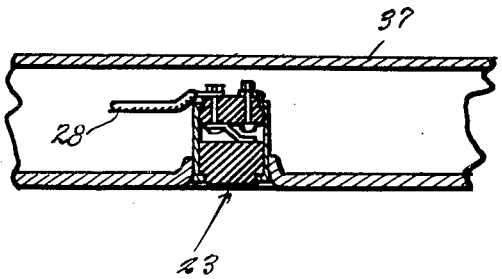
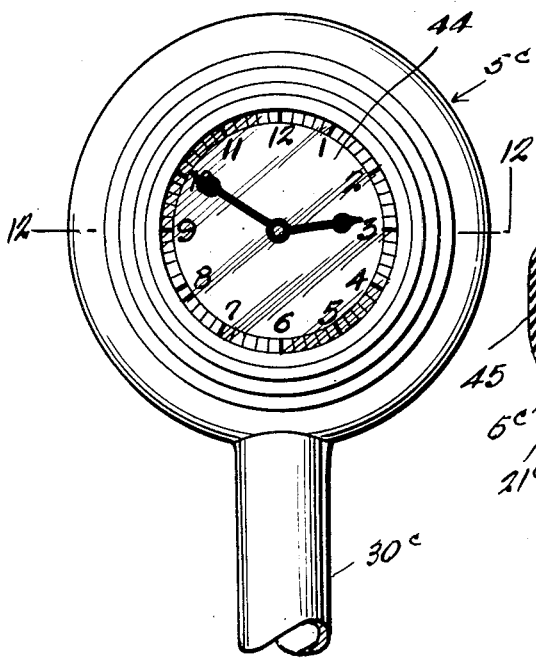
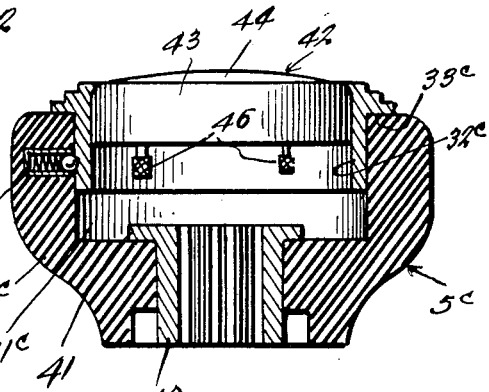
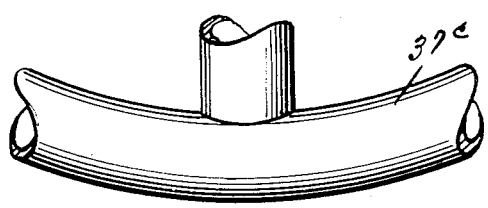
Inventor
M. H. Hollingsworth
By Clarence A. O'Brien
   Hyman Berman
                Attorneys Patented July 16, 1940

2,207,736

UNITED STATES PATENT OFFICE 2,207,736

AUTOMOBILE STEERING MEANS

Maurice H. Hollingsworth, Miami Beach, Fla.

Application September 3, 1936, Serial No. 99,295

7 Claims. (Cl. 74—552)

My invention relates generally to means for steering an automobile, and particularly to a device to take the place of a conventional steering wheel and to perform all of the functions inherent therein, besides other and additional important functions, and an important object of my invention is to provide automobile steering means of this character which procures for the driver greater control of and comfort in the steering operations, which eliminates the obstructions to clear vision now present in conventional steering wheels, particularly with respect to the road ahead and the instruments on the instrument panel.

Another important object of my invention is to provide an automobile steering means of the character indicated which by its shape and arrangement gives a more restful gripping arrangement for the hands of the driver, and which enables easier and more convenient operation of the warning signal such as a horn, so that the driver may conveniently sound the warning while having one hand engaged in holding and steering the steering device while the other hand is employed in working the gear shift lever or in applying the emergency brake.

Another important object of my invention is to provide automobile steering means of the character indicated which has greater flexibility and resiliency than conventional steering wheels, whereby the shock and vibration incident to conventional steering wheels and impinged on the hands and arms of the driver are much reduced or eliminated, so that it is possible to drive faster and for greater distances with less consequent fatigue on the part of the driver.

Another important object of my invention is to provide in arrangements of the character indicated above an adaptation of time telling means whereby the driver may keep constantly informed of the hour without materially shifting his eyes from the road or from the direction of the instrument panel directly in front of him.

Other important objects of my invention will be apparent from a reading of the following description taken in connection with the drawings, wherein for purposes of illustration I have set forth preferred embodiments of my invention.

In the drawings:

Figure 1 is a general top plan view of one embodiment of my invention showing in dotted lines the lateral deflections thereof under stress of driving.

Figure 2 is another embodiment of the invention.

Figure 3 is a top plan view of a still further embodiment of the invention.

Figure 4 is an edge elevational view of Figure 1 showing in dotted lines the vertical deflections thereof under driving conditions.

Figure 5 is a bottom plan view of the hub portion of the embodiment shown in Figure 1.

Figure 6 is a top plan view of Figure 5 with the cap removed.

Figure 7 is a transverse vertical sectional view taken through Figure 1 approximately on the line 7—7.

Figure 8 is a longitudinal sectional view taken through the spring contact member and approximately on the line 8—8 of Figure 4.

Figure 9 is a fragmentary bottom plan view of a portion of the rim of the steering means showing the mounting of one of the horn buttons thereon.

Figure 10 is a longitudinal sectional view taken through Figure 9 approximately on the line 10—10.

Figure 11 is a top plan view of the hub portion of another embodiment of my invention showing the mounting of time-telling means therein.

Figure 12 is a transverse vertical sectional view taken through Figure 11 approximately on the line 12—12.

It has been established that the circular steering wheel commonly in use, is one of the chief factors in producing fatigue in driving automobiles. This is due to the curvature of the wheel which fails to provide a natural grip for the hands of the driver but requires an undue and practically continuous exertion of the muscles controllling the hands, if a proper grip on the steering wheel rim is to be maintained while driving straight ahead and while making any turns. Aside from the circular form of the conventional type of steering wheel which is formed with at least two and generally with at least three spokes, no adequate provision has been made to produce flexibility in the steering wheel to prevent direct transmission to the hands and forearms of the driver the vibrations, shocks, and stresses produced by the motion of the automobile and the course of the steering wheel and front wheels thereof, as well as those incident to manipulation of the steering wheel. Where in certain instances some progress has been made toward producing a shock absorbing steering wheel, this has been at a sacrifice of strength and flexibility, and in all instances at an excessive cost. However, I have discovered means whereby all of these objections in steering means for an automobile are overcome, so that a natural grip for the hand's requiring the minimum of muscular effort, is provided, and wherein a minimum amount of effort is required to manipulate the wheel.

Referring in detail to the drawings and particularly to Figures 1, 4, 5, 6, 7, 8 and 9 thereof, the numeral 5 generally designates the hub portion which as shown in Figure 7 comprises a spherical segmental annular element 6 which has an annular slot 7 in its lower end receiving the upper end of the steering column tube 8, which steering column has mounted below its upper end portion an insulated ring 9 secured in place by screws or the like 10, which annular ring supports on its top a segmental or annular contact 11 which is connected by a wire 12 to the ungrounded side of the horn or battery, as the case may be.

In sliding contact with the top of the segmental or annular contact 11 is the contact head 13 which has a tubular portion 14 in which slides a plunger 15 which is mounted in a dielectric block 16. Between the block 16 and the bottom of the element 6 is an expanding spring 17 which pushes the plunger and hence the head 13 downwardly into contact with the ring 11 as shown particularly well in Figure 8 of the drawings. The tubular portion 14 of the contact head has an insulating bushing 18 thereon to prevent contact of the head with the interior of the grounded steering column 8. The upper end of the plunger 15 works through an insulated bushing 20 in the bottom of the element 6 and projects above the bottom of the well 21 which is formed in the top of the element 6, where the plunger has connected thereto a wire 22 running to one or both of the push button switches which are to be described herein.

The spherical segmental element 6 has an opening 6' therein which receives the upper part of the steering post 24 which turns within the steering column tube 8 and a washer 25 rests on the bottom of the well 21 and is held in place by a nut 26 which is threaded on the threaded part 27 at the upper end of the steering post, whereby the hub portion is mounted for rotation with the steering post 24. A key arrangement 27' engages slot means in the opening 6' in the bottom of the element 6 so as to key the wheel in a selected position on the steering post 24. The wire 22 as well as a second wire 28, running to the other horn button switch on the wheel, pass outwardly through an opening 29 formed in the side of the element 6 and through the bore of the single spoke 30 into the bore of the tubular rim. The single spoke which is secured to and extends radially outwardly from the element 6.

The spherical segmental cap 31 has a depending flange 32 defining a shoulder 33, and the flange seats in a groove 34 formed within in the upper part of the well 21 while the shoulder 33 rests on the top of the element 6. A set screw 35 traverses the upper part of the element 6 for engaging and locking in place the cap 31, as clearly shown in Figure 7. It is obvious that the time-telling means shown in Figures 11 and 12 might with small modification be substituted for the cap 31.

As shown in Figures 5 and 6 the opening 23 in the bottom of the element 6 is provided with keyways 36 circumferentially spaced entirely therearound, instead of being provided with only one keyway as is usual in steering wheels. This arrangement is provided so that the steering means of the invention can be mounted in a variety of positions relative to the steering post 24, with the prime purpose of assuring that the single spoke 30 can be always in the straight up and down position in a straight ahead arrangement of the wheels of the automobile, so as to definitely assure the driver of the position of the front wheels at all times.

The formations and arrangements of the hub portion 5 described above are characteristic of each of the embodiments of the invention shown in Figures 1, 2 and 3. Each embodiment possesses the single spokes 30, 30a and 30b, respectively, and a rim fastened thereto, the rims being designated 37, 37a and 37b, respectively. Each of the rims is provided on its underside on a diameter which lies in a plane at right angles to the plane in which the single spoke lies, with push button switches 23, 23a, and 23b, respectively. In addition to these push button switches third push button switches 38, 38a and 36, respectively, are provided in the bottom of the single spoke, the purpose of the last mentioned switches being to connect the warning signal or horn to means for sounding the horn in a louder than usual manner in an emergency, or to operate the horn in the usual way, in any case without removing the hand or hands from the rim and/or spoke of the steering device.

Each of the steering devices is made of special flexible metal of adequate strength, such as is now being used in the construction of certain types of steel chairs and the like, and which is also employed in aeroplane construction where extreme strength is required along with light weight.

In the case of the embodiment of Figure 1 the rim 37 is formed of tubing material of the type indicated, and the single spoke 30 is formed of the same material and these are inseparably connected together in some suitable manner and the radially inward end of the spoke is adequately connected as by welding or the like to project radially from one side of the hub 5. The flexibility of the material in this form is such that when for any reason a stress in a lateral plane to either side is exerted by the driver on the steering wheel, the spoke will flex as indicated by the dotted lines in Figure 1 so as to permit lateral displacement commensurate with the stress exerted on the rim, so that the rim is in effect laterally displaced in a compensatory manner, so as to relieve the hands and arms of the driver of the shock which would be present if there were no such "give" present. Accompanying the distortion or flexing of the spoke 30 is a proportionate flexing or distortion of the rim 37 itself which contributes to the easing of the transmission of any shock to the hands of the driver.

Referring to the embodiment of the invention shown in Figure 2, this is formed of the same material as the first described embodiment and has all features in common therewith except the formation of the rim 37a. In this embodiment the top portion of the rim which is circularly curved in the case of the priorly described embodiment is chordal in character as indicated by the numeral 39, so as to in effect bring the top of the steering wheel rim downwardly into a position in which it does not interfere with the driver's view of the instrument panel and of the road; and at the same time provide a grip for the hands to rest upon during driving, and in a more natural position than is afforded by the circular rim 37. Inherent in the present embodiment as well as in the other embodiments of the invention is the clear vision which is afforded the driver of the instrument panel, because of the absence of any spokes above or at the sides of the single spoke 30. The hands of the driver may rest on the bar 39 in a natural handle bar position and thereby be afforded a degree of comfort and effective grip not possible with a conventional steering wheel, in addition to the flexible and shock-absorbing characteristics.

In the embodiment of the invention shown in Figure 3 rim 37b possesses in addition to the features of the embodiments shown in Figures 1 and 2, the lower chordal bar 40 which is substantially parallel to the upper chordal bar 39b and has the spoke 30b somewhat fore-shortened and attached to the middle thereof as clearly shown in Figure 3. This embodiment affords in addition to the advantages of the priorly described embodiments, more clearance under the steering wheel without shifting the axis of the steering wheel, and affords also an additional horizontal grip or rest for the hands, which greatly increases the comfort of driving especially on long tours, besides greatly facilitating entering and leaving the automobile, particularly in the cases of stout persons; and without in any way sacrificing any of the advantages or utilities of the conventional steering wheel.

Referring now to the embodiment shown in Figures 11 and 12, the hub portion 5c includes a greatly modified element 6c which has mounted therein the bushing 40 for engagement with the steering post 24 and having a flange 41 resting on the floor of the recess 21c or well.

A timepiece generally designated 42 has a depending flange 32c and a shoulder 33c, corresponding to the flange 32 and the shoulder 33 shown in Figure 7, which seat into the well 21c and onto the top of the element 6c, respectively, in the manner clearly indicated in Figures 7 and 12, whereby the clockworks 43 with its upwardly turned face 44 is disposed in full view at the top of the hub 5c. A suitable detent arrangement 45 in the side of the well 21c engages the flange 32c to hold the timepiece removably in place and to enable easy removal thereof for manipulation of the winding and setting means which are generally designated 46. By means of this arrangement the operator of the automobile has continually the time before him which he can reach with his eyes without removing his eyes from the general sphere of the instrument panel and the road ahead.

Although I have shown and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:

1. A steering device for an automobile steering post, said steering device comprising a hollow hub formed in its bottom with an axial opening receiving and fastened to said steering post, a single tubular spoke projecting radially outwardly from one side of said hub, and a tubular rim to which the radially outward end of said single spoke is fastened, said spoke and said rim being formed of high tensile tubing permitting flexing of the spoke and rim relative to said hub, and of said rim relative to said spoke, a major portion of said rim being concentric with the axis of said hub, and a minor segment of said rim being straight.

2. A steering device for an automobile steering post, said steering device comprising a hollow hub formed in its bottom with an axial opening receiving and fastened to said steering post, a single tubular spoke projecting radially outwardly from one side of said hub, and a tubular rim to which the radially outward end of said single spoke is fastened, said spoke and said rim being formed of high tensile tubing permitting flexing of the spoke and rim relative to said hub, and of said rim relative to said spoke, portions of said rim being concentric with the axis of said steering post, other portions of said rim being straight.

3. A steering device for an automobile steering post, said steering device comprising a hollow hub formed in its bottom with an axial opening receiving and fastened to said steering post, a single tubular spoke projecting radially outwardly from one side of said hub, and a tubular rim to which the radially outward end of said spoke is fastened, said spoke and said rim being formed of high tensile tubing permitting flexing of the spoke and rim relative to said hub, and of said rim relative to said spoke, portions of said rim being concentric with the axis of said hub, other segments of said rim being substantially straight and substantially parallel with respect to each other.

4. A steering device for an automobile steering post, said steering device comprising a hollow hub formed in its bottom with an axial opening receiving and fastened to said steering post, a single tubular spoke projecting radially outwardly from the side of said hub, and a tubular rim to which the radially outward end of said single spoke is fastened, said opening in the bottom of the hub being formed with several circumferentially spaced key-slots to provide for accurately positioning said device on the steering post with said single spoke in the desired position.

5. A steering device for an automobile, said automobile having a steering post surrounded by a steering column, said steering device comprising a hollow hub having an opening in its bottom receiving said steering post above said steering column, means securing said hub to said steering post, a single spoke projecting radially outwardly from the side of said hub, a rim to which the radially outward end of said spoke is fastened, said hub being formed with an open top, and a cap in the form of a timepiece mounted on said hub to close the open top of said hub.

6. A steering device for an automobile, said automobile having a steering post surrounded by a steering column, said steering device comprising a hollow hub having an opening in its bottom receiving said steering post above said steering column, means securing said hub to said steering post, a single spoke projecting radially outwardly from the side of said hub, a rim to which the radially outward end of said spoke is fastened, said hub being formed with an open top, and a cap in the form of a timepiece mounted on said hub to close the said open top of said hub, said cap having a flange telescoping into the interior of said hub, and detent means removably holding said cap in place.

7. A steering post operating device, said device comprising a hollow hub provided with an axial opening in its bottom to receive the steering post, means engaged with the said bottom of the hub and said steering column and fastening the hub on the steering column, said hub being formed with a side opening, a single tubular spoke secured to extend radially from the hub, the radially inward end of said single spoke being registered with said side opening, and rim surrounding said hub and connected for sole support to the radially outward end of said single spoke, said rim being tubular in form, said rim having an opening at the point of junction with and communicating with the radially outward end of said single spoke, the interiors of said rim, spoke, and hub providing electric wire accommodating passage means.

MAURICE H. HOLLINGSWORTH.